(12) United States Patent
Lee et al.

(10) Patent No.: US 9,715,017 B2
(45) Date of Patent: Jul. 25, 2017

(54) USING DME FOR TERRESTRIAL TIME TRANSFER

(71) Applicant: iPosi, Inc., Denver, CO (US)

(72) Inventors: Richard M. Lee, Denver, CO (US); Eric Derbez, Vancouver (CA)

(73) Assignee: iPosi, Inc., Denver, CO (US)

( * ) Notice: Subject to any disclaimer, the term of this patent is extended or adjusted under 35 U.S.C. 154(b) by 0 days.

(21) Appl. No.: 15/061,808

(22) Filed: Mar. 4, 2016

(65) Prior Publication Data

US 2016/0356891 A1 Dec. 8, 2016

Related U.S. Application Data

(60) Provisional application No. 62/129,445, filed on Mar. 6, 2015.

(51) Int. Cl.
| | |
|---|---|
| *G01S 19/11* | (2010.01) |
| *G01S 19/31* | (2010.01) |
| *G01S 5/02* | (2010.01) |
| *G01S 5/00* | (2006.01) |
| *G01S 19/48* | (2010.01) |
| *G01S 19/24* | (2010.01) |
| *G04F 1/00* | (2006.01) |

(52) U.S. Cl.
CPC ............. *G01S 19/11* (2013.01); *G01S 5/0263* (2013.01); *G01S 19/31* (2013.01); *G01S 5/00* (2013.01); *G01S 19/24* (2013.01); *G01S 19/48* (2013.01); *G04F 1/00* (2013.01)

(58) Field of Classification Search
CPC .......... G01S 19/11; G01S 19/48; G01S 19/24; G01S 19/31; G01S 5/00; G01S 5/0263

USPC ............ 342/357.48, 357.31, 357.49, 357.71
See application file for complete search history.

(56) References Cited

U.S. PATENT DOCUMENTS

| | | | | |
|---|---|---|---|---|
| 4,359,733 A | * | 11/1982 | O'Neill | G01S 5/14 |
| | | | | 342/357.31 |
| 7,564,404 B2 | * | 7/2009 | Katz | G01S 5/0231 |
| | | | | 342/357.31 |
| 8,095,161 B2 | * | 1/2012 | Sandberg | H04W 56/0045 |
| | | | | 342/465 |
| 8,462,044 B1 | * | 6/2013 | Ho | G01S 5/021 |
| | | | | 342/353 |

(Continued)

*Primary Examiner* — Chuong P Nguyen
(74) *Attorney, Agent, or Firm* — Marsh Fischmann & Breyfogle LLP (57) ABSTRACT

Techniques for allowing a remote or fielded receiver to derive a precise time reference (such as Coordinated Universal Time (UTC)) when the fielded receiver is not able to derive time directly from received GPS signals. One or more fixed DME reference stations are located within range of DME beacon signals from an existing DME beacon station, the DME reference stations also having the capability to receive GPS signals and derive UTC therefrom. Based on the known distance between the DME reference station and the DME beacon station, the DME reference station can determine the time of transmission from the DME beacon station of each DME beacon signal. This time tag information is then provided to the fielded receiver, which is also within range of DME beacon signals from the DME beacon station. With this time tag information, the fielded receiver can correlate that with the received DME beacon signals and derive UTC to within an acceptably small margin.

3 Claims, 8 Drawing Sheets

(56) References Cited

U.S. PATENT DOCUMENTS

| | | | |
|---|---|---|---|
| 8,736,482 B2* | 5/2014 | Wu | G01S 5/10 342/30 |
| 8,791,861 B2* | 7/2014 | Garcia | G01S 5/10 342/387 |
| 8,890,746 B2* | 11/2014 | Alizadeh-Shabdiz | G01S 5/0263 342/357.23 |
| 9,557,422 B1* | 1/2017 | Miller | G01S 19/46 |
| 2009/0303116 A1 | 12/2009 | Wirola et al. | |
| 2011/0156878 A1* | 6/2011 | Wu | G01S 5/0081 340/10.1 |
| 2012/0056781 A1 | 3/2012 | Kong et al. | |
| 2012/0146833 A1* | 6/2012 | Pawlitzki | G01S 7/003 342/37 |
| 2012/0172054 A1 | 7/2012 | Waters et al. | |
| 2012/0249368 A1 | 10/2012 | Youssef et al. | |
| 2012/0289243 A1 | 11/2012 | Tarlow et al. | |
| 2014/0354481 A1* | 12/2014 | Holmes | G01S 19/11 342/465 |
| 2015/0331099 A1* | 11/2015 | Wu | G01S 13/876 342/32 |

* cited by examiner

USING DME FOR TERRESTRIAL TIME TRANSFER

| GLOSSARY | |
|---|---|
| 3GPP | Third Generation Partnership Program |
| AWGN | additive white Gaussian noise |
| ASF | Additional Secondary Factor |
| alpha | filter roll off factor |
| BCCH | broadcast control channel |
| C | carrier power |
| CCCH | common control channel |
| CI | coherent integration |
| dB | decibel |
| DME | Distance Measuring Equipment |
| E911 | Enhanced 911 |
| $E_b$ | Energy per bit |
| $E_c$ | Energy per chip |
| $E_s$ | energy per symbol |
| EIRP | effective isotropic radiated power |
| IF | Intermediate Frequency |
| FCC | Federal Communications Commission |
| GHZ | gigahertz |
| GNSS | global navigation by satellite system |
| GNSS | Global Position System |
| KHz | kilohertz |
| Km | kilometer |
| LTE | Long Term Evolution |
| MHz | megahertz |
| m | meter |
| ms | milliseconds |
| $N_0$ | noise power spectral density |
| NCI | non coherent integration |
| ns | nanosecond |
| NTP | Network Time Protocol |
| OCXO | oven-controlled crystal oscillator |
| PTP | Precision Time Protocol |
| Rx | receive |
| SNR | signal to noise ratio |
| spc | samples per chip |
| sps | samples per symbol |
| SV | satellite vehicle |
| TCXO | temperature-controlled crystal oscillator |
| Tx | transmit |

BACKGROUND

This disclosure addresses time transfer and time keeping for synchronization. Various modern electronic devices obtain accurate time of day information from GPS/GNSS signals received from GPS/GNSS satellites. Most also determine their location from the GPS/GNSS signals.

For a variety of reasons, electronic devices can go through temporary periods where they are not able to successfully received GPS/GNSS signals. In the event of the loss of GPS/GNSS signals due to any loss of signal including external jamming (e.g., due to the operation of a Personal Privacy Device (PPD) in the nearby vicinity or due to innocent or less nefarious means), loss of a GPS/GNSS receiver hardware or software function, or any other mechanism disabling truthful reception of GNSS signals, the techniques taught herein provide an alternative time transfer method of GPS/GNSS where precise grade of time transfer or alignment is needed at remote receiver locations. Throughout this disclosure the generic term GNSS, the specific term GPS, or the combination GPS/GNSS may be used and such references shall refer to any such system, including GPS, GLONASS (Russian), Galileo (European), Indian Regional Navigation Satellite System (IRNSS), BeiDou-2 (Chinese), or other such comparable system.

In current systems, if GPS/GNSS is lost, the timing system in an electronic device reverts to free-running on hold-over. This is a capability whose accuracy is based on the design stability of the local oscillator. The local oscillator (without GPS governance) will continue to operate in free-run mode which in turn will cause it to slowly drift in frequency, and thus drift over time. The degree of drift is solely a function of the stability of the chosen oscillator. The frequency sources that provide a degree of holdover range from TCXOs and OCXOs to Rubidium oscillators to atomic clocks. All of these will eventually drift, thus losing track of time on the order of minutes to a few hours depending on each source's stability and the environment to which the source is exposed. For instance, drift exceeding one microsecond in modern wireless communication networks is unacceptable, but the sources just mentioned may only be able to assure hold over for about 4 hours before system degradation sets in or more costly stability and holdover times are required.

It is against this background that the techniques described herein have been developed.

SUMMARY

Disclosed herein is a method for deriving a precise time reference when GNSS signals are not directly available. The method includes determining that GNSS signals are not directly available; receiving a plurality of DME beacon signals from a DME beacon station; receiving precise timing information from a DME reference station, the precise timing information including time tags for each DME beacon signal received by the DME reference station from the DME beacon station, the time tag including a precise time reference for the time that the DME beacon station sent the respective DME beacon signal; and deriving a precise time reference from the DME beacon signals received from DME beacon station and the time tags received from the DME reference station corresponding to the received DME beacon signals.

The deriving may not require any knowledge of the position of the DME reference station or the distance to the DME reference station. Multiple DME beacon signals may be received from the DME beacon station within a two-second period, and the deriving may include integrating over the multiple received DME beacon signals to improve the signal-to-noise ratio. The method may further include calculating a time tag for a time of transmission of each of the plurality of received DME beacon signals, based on a known travel time from the DME beacon station. The deriving may include finding a correlation between the received plurality of DME beacon signals and the DME beacon signals received by the DME reference station. Finding the correlation may include performing a series of correlations as the time that the plurality of DME signals were believed to have been received is shifted by predetermined time increments.

The derived precise time reference may include UTC time. The derived precise time reference may be used to help reacquire GNSS signals. Signals received from the DME reference station and the plurality of DME beacon signals received from the DME beacon station may be stored in one or more buffers for subsequent processing. The plurality of DME beacon signals received from the DME beacon station may be integrated. The integration may be selectively performed based on the signals received from the DME reference station.

Also disclosed herein is a method for deriving a precise time reference when another precise time reference is not available. The method includes receiving DME beacon signals from a DME beacon station and receiving precise timing information from a DME reference station. When the another precise time reference is not available, a precise time reference is derived from the DME beacon signals received from local DME beacon station and the precise timing information received from the DME reference station.

The precise timing information received from the DME reference station may include time tags for each DME beacon signal received by the DME reference station from the DME beacon station, the time tag including a precise time reference for the time that the DME beacon station sent the respective DME beacon signal. The another precise time reference may be GNSS time or GPS time.

Also disclosed herein is a system for deriving a precise time reference with the aid of DME beacon signals from a DME beacon station. The system includes a DME reference station located within range of the DME beacon signals from the DME beacon station, the DME reference station receiving GNSS signals and determining a precise time reference therefrom, the DME reference station also receiving DME beacon signals from the DME beacon station and determining the time of transmission of one or more of the DME beacon signals from the DME beacon station based at least in part on the distance between the DME beacon station and the DME reference station and a receiver also located within range of the DME beacon signals from the DME beacon station, the receiver being in communication with the DME reference station to receive from the DME reference station the time of transmission of the one or more DME beacon signals, wherein the receiver derives a precise time reference based at least in part on the received DME beacon signals and their time of transmission from the DME beacon station.

The derivation by the receiver may also be based on the distance between the DME beacon station and the receiver.

Also disclosed herein is a method for providing timing information to a remote receiver, in part by utilizing DME beacon signals from a DME beacon station. The method includes receiving DME beacon signals from a DME beacon station at a DME reference station; determining the time of transmission of one or more DME beacon signals from the DME beacon station based at least in part on the distance between the DME beacon station and the DME reference station; and communicating the time of transmission of the one or more DME beacon signals to a remote receiver.

The DME reference station may also receive GNSS signals from which a precise time reference is determined. The time of transmission of DME beacon signals from the DME beacon station includes UTC time.

DETAILED DESCRIPTION

While the disclosure is susceptible to various modifications and alternative forms, specific embodiments thereof have been shown by way of example in the drawings and are herein described in detail. It should be understood, however, that it is not intended to limit the disclosure to the particular form disclosed, but rather, the disclosure is to cover all modifications, equivalents, and alternatives falling within the scope as defined by the claims.

The techniques herein assume that the devices (e.g., fielded receivers as described below) were previously receiving GPS/GNSS signals successfully and obtaining accurate time information therefrom. Thus, the devices know their location accurately.

The techniques discussed herein draw on infrastructure resources already in place for providing accurate distance information to today's aircraft. Further, it is not necessary for this existing infrastructure to be modified in any manner. This existing infrastructure includes a system known as the Distance Measuring Equipment ("DME") system, which includes a network of DME beacon stations at various known locations operating at various frequencies and also includes DME transmitters/receivers/processors in aircraft. A DME beacon is a two-way ranging system that may operate in the 960-1215 MHz frequency band. From the air, aircraft can detect one or more of these DME beacon signals from DME beacon stations, which enables these over-flying aircraft to compute their slant ranges to each DME beacon station based on the known position of each DME beacon station. DME beacon stations receive and transmit on assigned channels (the inventive techniques herein exploit only the signals transmitted from the DME beacon stations) and will reply to a two pulse query (also called an Interrogation) from an aircraft, with a characteristic reply latency of exactly 50 µs delay, with a two pulse doublet having a precise spacing between the pulses of 12 µs. The techniques presented herein use the DME beacon signals (which do not presently encode time) passively (again, there is no mandatory change or modification to the aviation DME infrastructure) to disseminate referenceable time to receivers that are fielded and a priori position-calibrated.

This system can be used for time keeping or time referencing of fixed devices, as well as aircraft. The new component added to make the techniques herein work is a national network of metropolitan region DME reference stations to monitor DME traffic and time-tag transmission time of aviation-triggered DME reply pulse pairs. The metro-based DME reference stations forward (over the IP or other suitable network) this data to fielded receivers who in the first use of these techniques have already an exact position, but this method can also be used to initially assist acquisition of GPS if the fielded receiver initial position is inexact up to 20 km. The term "fielded receiver" is used herein to designate a device which may or may not be portable (e.g., a stationary device, a smart phone, or other), may be indoors or outdoors, and may or may not be in a position where it can receive GNSS signals.

This approach is desirable also in that it imposes no equipment or operational changes on to the civil and military DME systems that are deployed internationally.

Each DME reference station within range of the DME beacon station attaches in real time a time-tag for each DME response burst-pair. These time tags will have random interrogation intervals depending on nearby airplane queries of surrounding DME beacon stations. There are typically enough queries to expect many bursts within a second or two which provides enough signal to provide a sufficient signal-to-noise ratio, SNR. The DME reference stations provide this time-tagged information to the fielded receivers. The fielded receivers correlate this time-tagged information from the DME reference stations with the DME beacon signals directly received by the fielded receivers from the DME beacon station to derive time. The physical timing mark of the DME transmission is based on measurement of the half-amplitude point at the rising edge of the first of the two pulse pair.

Figure 1:
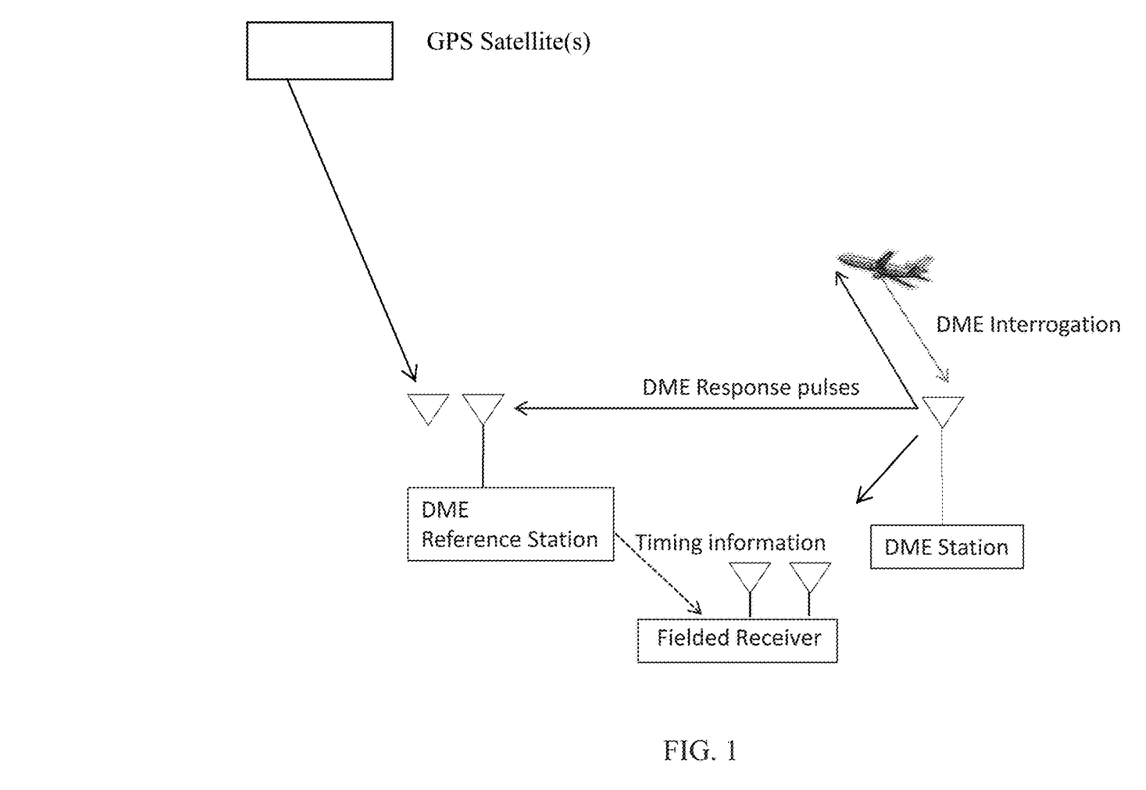
FIG. 1 is a high level diagram of use of the techniques disclosed herein to allow a device to derive a precise time reference.

These techniques rely on the DME reference stations being situated where each has clear DME beacon reception to accurately time-tag transmitted DME pulse-pairs obtained from each DME beacon station to which the reference station is tuned (DME beacon stations are assigned unique station broadcast frequencies within a geographical area to avoid intra-system interference from the same frequency transmissions in the same region). Since each DME beacon station position as well as the DME reference station position are both known, one can then time-tag all received DME pulse-pairs within a metro region and tag their corresponding transmission times with respect to GPS absolute time also received at the reference station (see FIG. 1).

Figure 2:
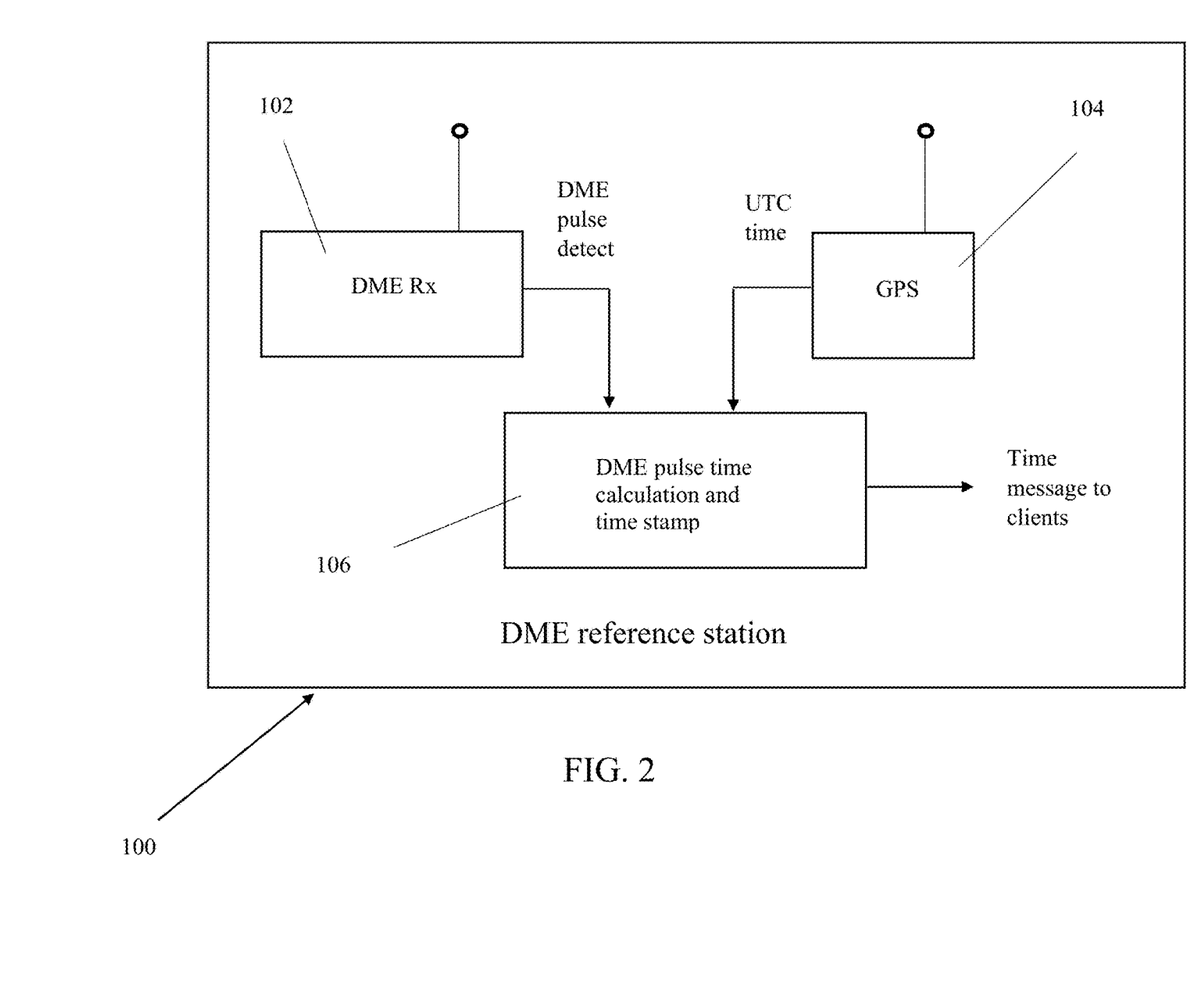
FIG. 2 is a block diagram of the major functionality in a DME reference station that permits a fielded receiver to derive a precise time reference.

FIG. 2 shows the major functionality in a DME reference station 100. A DMR receiver 102 receives beacon signals from a nearby DME beacon station. A GPS receiver 104 receives GPS signals from GPS satellites. Signals from the receivers 102 and 104 are provided to a DME Pulse Time Calculation and Time Stamp Module 106. This module 106 determines the GPS time (e.g., UTC time) when each DME beacon signal was received and also determines (using the known latency due to the travel time of the beacon signal) the GPS time when the DME beacon signal was sent. The GPS time that each DME beacon signal was sent from the DME beacon station is provided as an output from the DME reference station 100 to clients, such as one or more fielded receivers. This communication can be via various means including via the internet, such us via Internet Protocol (IP).

In order to use this information, the fielded receiver obtains any nearby DME beacon signals and based on its exact location that is ascertained by GPS prior to GPS outage, and on an ongoing basis, it receives the nearest DME reference stations' DME transmission time-tags adjusted for additional latency between the fielded and reference receiver or the DME beacon station, then is correlated with the known reference-to-fielded receiver path time latencies.

In particular, the location of the DME reference station(s) need not be known to the fielded receivers; all they need is the public location of the DME beacon station(s) and a data feed from the DME reference station with the precise transmit times of the burst pairs from the nearest DME beacon station(s).

The receiver could then use a variety of network time protocols including PTP IEEE1588v2 or NTP to assist it in obtaining its approximate GNSS time to within several tens of microseconds to several milliseconds of accuracy, and by using the fielded receiver's known position as well as exact location of the DME beacon station, the fielded receiver operating without GPS/GNSS will be able to look into its buffer of received data and find the approximate location of the pulse-pairs (at that DME beacon station broadcast frequency) for correlation, which then provides windows of time integration. It could also use the time as available under holdover from GNSS, which could be more accurate than network-derived time. Once the system knows GNSS is lost, after some duration it could switch to search for DME beacon signals.

Figures 3A, 3B:
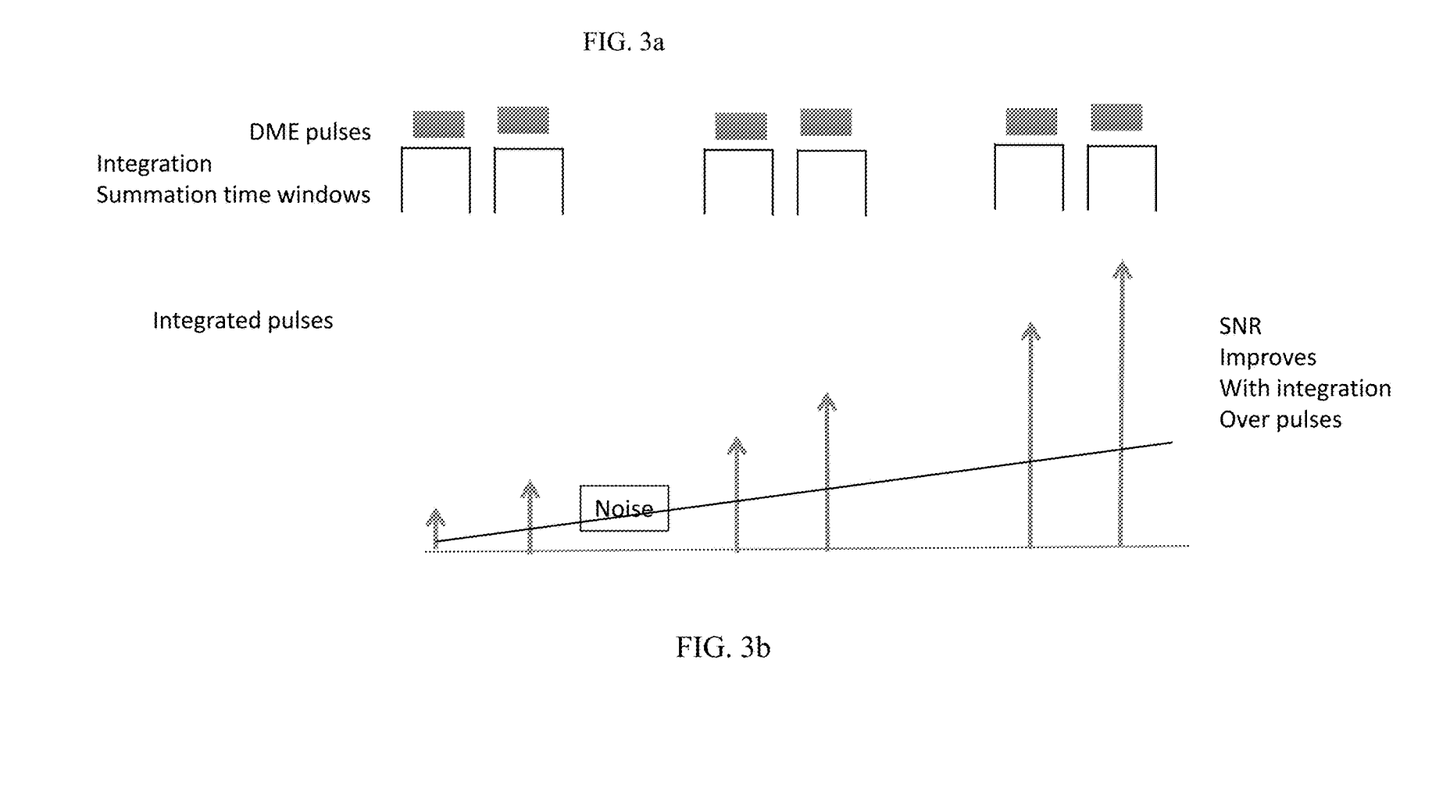
FIG. 3a is an illustration of the integration/summation of DME pulses and FIG. 3b is a graph of SNR increasing (improving) with further integration.

The fielded receiver signal detection and time marking process relies on classic integration methods using both coherent and non-coherent methods well known in the art. As the number of pulse pairs are sequentially integrated (see FIG. 3a), for a given amount of time to collect time-tagged DME signal bursts, the signal to noise ratio (SNR) also increases as depicted in FIG. 3b. This is due to the acquired DME burst signals adding coherently while the noise adds non-coherently, which increases the signal level faster than the increase to the noise level, which serves to increase SNR. SNR is also a function of coherent integration time plus the sum of non-coherently summed samples. No samples are correlated during the time intervals between DME beacon station burst pairs to avoid summing additional noise. This 'masking' over periods of known silence will further enhance the SNR at the fielded receiver. Each kilometer between the known position of the fielded receiver and the DME beacon station generates 3 microseconds of time transfer latency, which is ultimately accounted for at the fielded receiver.

The precise time-tagging of the transmit bursts of the DME beacon station(s), together with the known position of the DME beacon station and the fielded receiver, will help maintain time accurately to within 150-300 ns time indefinitely until GNSS signals are restored (successfully received by the fielded receiver).

Alternatively, this method can also be used to transfer time to initiate GPS/GNSS acquisition. In this case, using this DME time transfer method would allow a receiver with a relatively coarse starting position to acquire time to within 15-30 microseconds, which is ample resolution to achieve high sensitivity acquisition. In many cases, this could be available from GNSS holdover.

The high level description of the system is as follows:

By ascribing a time to to the 'first-ever' pulse-pair, the fielded receiver can then perform an integration over N pulse-pairs to build up enough processing gain to correlate the absolute reception time of the beginning of the train of N pulse-pairs. This is so, since the time differences between the first pair observed and subsequent pairs are known exactly from the DME reference station. The size of the correlation window is determined by the a priori error in the PTP or NTP time transfer to the fielded (fixed) receiver plus the error in the fielded receiver's a priori position error (converted to light-time). The value of N depends on the average number of pulse-pairs per second received at a given DME beacon station as well as the stability of the fielded receiver's local oscillator. Note that the fielded receiver will have to buffer a certain amount of IF data to account for the network latencies associated with DME reference station data. This buffer size will also depend on the size of the correlation window.

In the post-acquisition mode, it is assumed that the fielded receiver's position is well known (e.g., it is typically known to within 20-30 m of ground truth) and thus have certainty of absolute GNSS time transfer to within 100 ns. By correlating the reception of pulse-pairs with the local GNSS computed time and recording the bias or latencies with respect to the DME reference station due to radio propagation transmission time, the fielded receiver can tolerate the loss of GNSS reception by applying this bias when measuring or keeping time, solely using DME beacon signals. The benefit here is that any multi-path for DME beacon signals is calibrated out once local GNSS time transfer is achieved. So long as local topography does not change, the DME beacon station to fielded receiver multi-path characteristics should be fairly constant over time.

Figure 4:
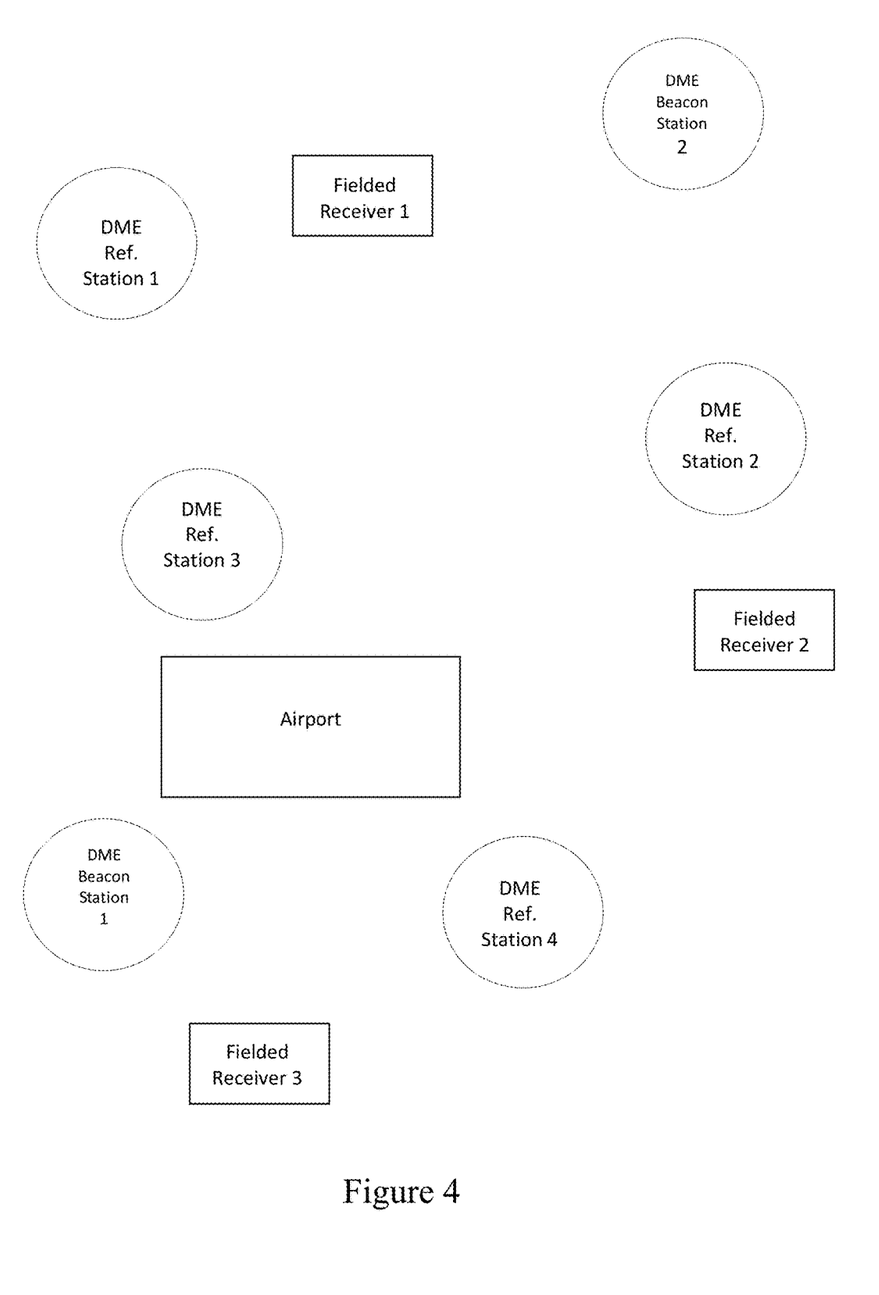
FIG. 4 is a map view diagram of four DME reference stations and their positions relative to a pair of DME beacon stations, an airport, and three fielded receivers.

FIG. 4 is a map view diagram of four DME reference stations (Ref. Stations 1-4) and their positions relative to a pair of DME beacon stations (DME Beacon Stations 1 and 2), an airport, and three fielded receivers (Fielded Receivers 1, 2, and 3).

Figure 5:
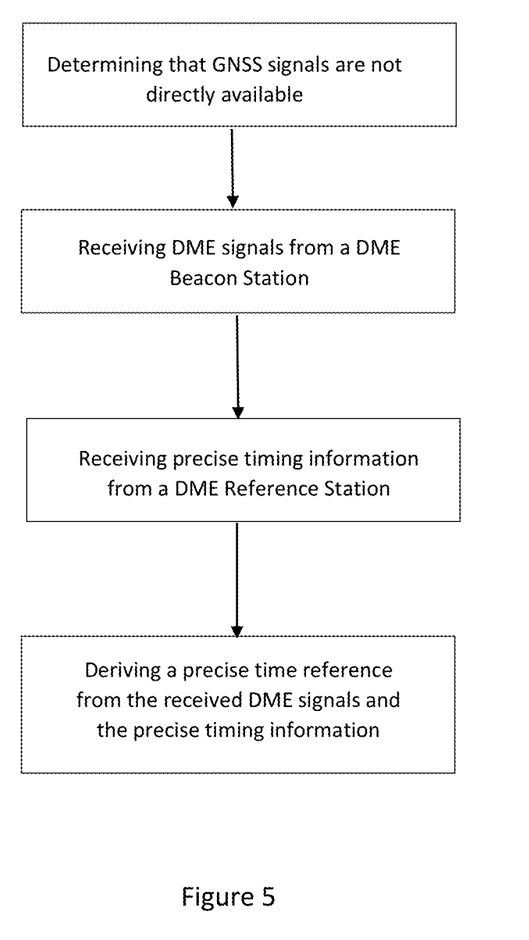
FIG. 5 is a flowchart of certain techniques disclosed herein.

FIG. 5 is a flowchart showing a method for deriving a precise time reference when GNSS signals are not directly available. The method includes determining that GNSS signals are not directly available; receiving DME beacon signals from a DME beacon station; receiving precise timing information from a DME reference station; and deriving a precise time reference from the received DME signals and the precise timing information.

Figure 6:
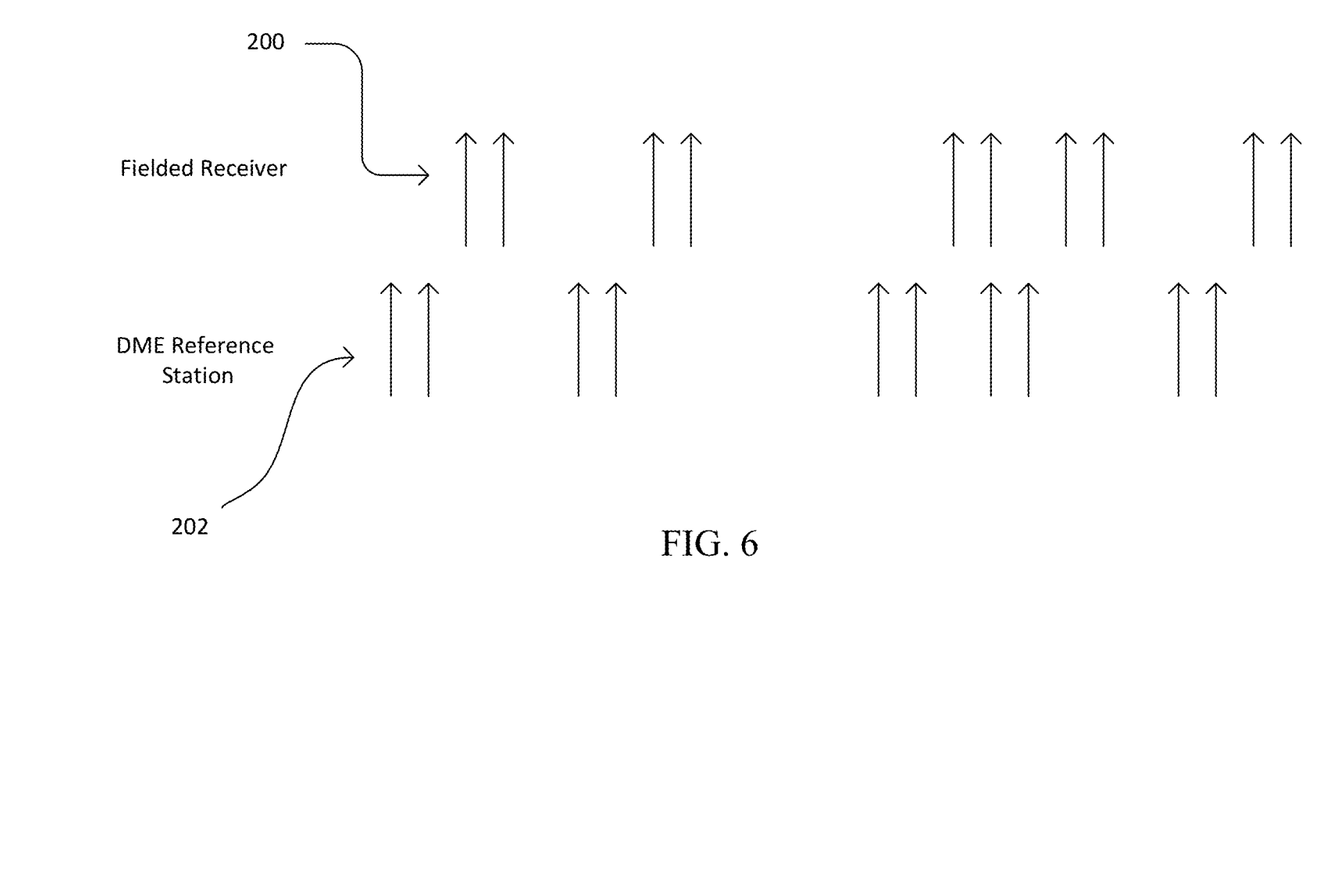
FIG. 6 shows two series of signals versus time in a situation where they are not well correlated in time.

FIG. 6 shows a series 200 of pulse doublets that have been received by a fielded receiver directly from a given DME beacon station. The pulses in each doublet are separated from each other by 12 microseconds. The horizontal axis in FIG. 6 represents coordinated universal time (UTC) when the fielded receiver calculates that each pulse was transmitted from the DME beacon station. The fielded receiver has made this calculation by determining when the field receiver received each pulse, relative to the fielded receiver's best idea of UTC while not currently successfully receiving GPS/GNSS signals. The fielded receiver has then adjusted that time by the amount of time it took for the pulse to travel from the DME beacon station to the fielded receiver. Of course, the fielded receiver has a good understanding of this travel time since it has a good understanding of the location of the DME beacon station and of the location of the fielded receiver. Note that each pulse doublet is separated from the previous doublet and from the next doublet by a random number that is reflective of the interrogation signals received from nearby aircraft.

FIG. 6 also shows a series 202 of pulse doublets that have been received by the fielded receiver from the DME reference station (in reality, instead of actual pulses, they are merely the times when the DME reference station has determined that each of these pulses was transmitted by the DME beacon station in UTC). Again, the pulses in each doublet are separated from each other by 12 microseconds. Note again that each pulse doublet is separated from the previous doublet and from the next doublet by a random number that is reflective of the interrogation signals received from nearby aircraft. Except in this case, that random spacing interval matches well with the series of pulse doublets received by the fielded receiver directly from the DME beacon station. That is, the spacing between each doublet can be seen to match, but there is an absolute time offset between the two series that is due to the fielded receiver not having a good understanding of UTC. So, when the fielded receiver runs a correlation between these two series of doublets, it gets a low correlation value.

Next, the fielded receiver changes its current understanding of UTC by a predetermined amount (e.g., the burst width, which for example might be 3.5 microseconds). Based on the amount of error that the fielded receiver has determined it has from using Precision Time Protocol (PTP, the fielded receiver might determine that it needs to search for a good correlation within a 100 microsecond window, for example. The two series are then correlated again and a correlation value is determined. This will occur repeatedly, until a high correlation value is achieved. The degree of correlation (or the threshold that determines whether a high correlation value has been achieved) may be based on the SNR, or it may be based on the highest correlation achieved within the window, or on some combination of or alternative to these two techniques.

Figure 7:
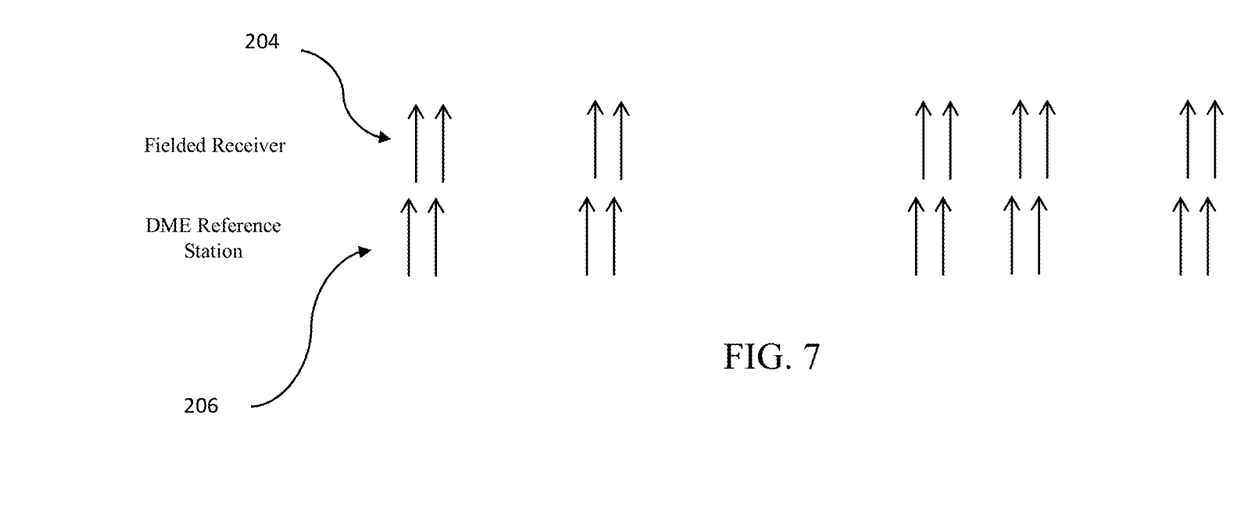
FIG. 7 shows two series of signals versus time in a situation where they are better correlated in time than in FIG. 6.

FIG. 7 shows a situation once there is a greater amount of correlation (perhaps after many steps in time have been tried). In this case, the two series 204 and 206 of pulse doublets are much closer in time than the two series were in FIG. 6. The process may continue to attempt to find even better correlation.

Figure 8:
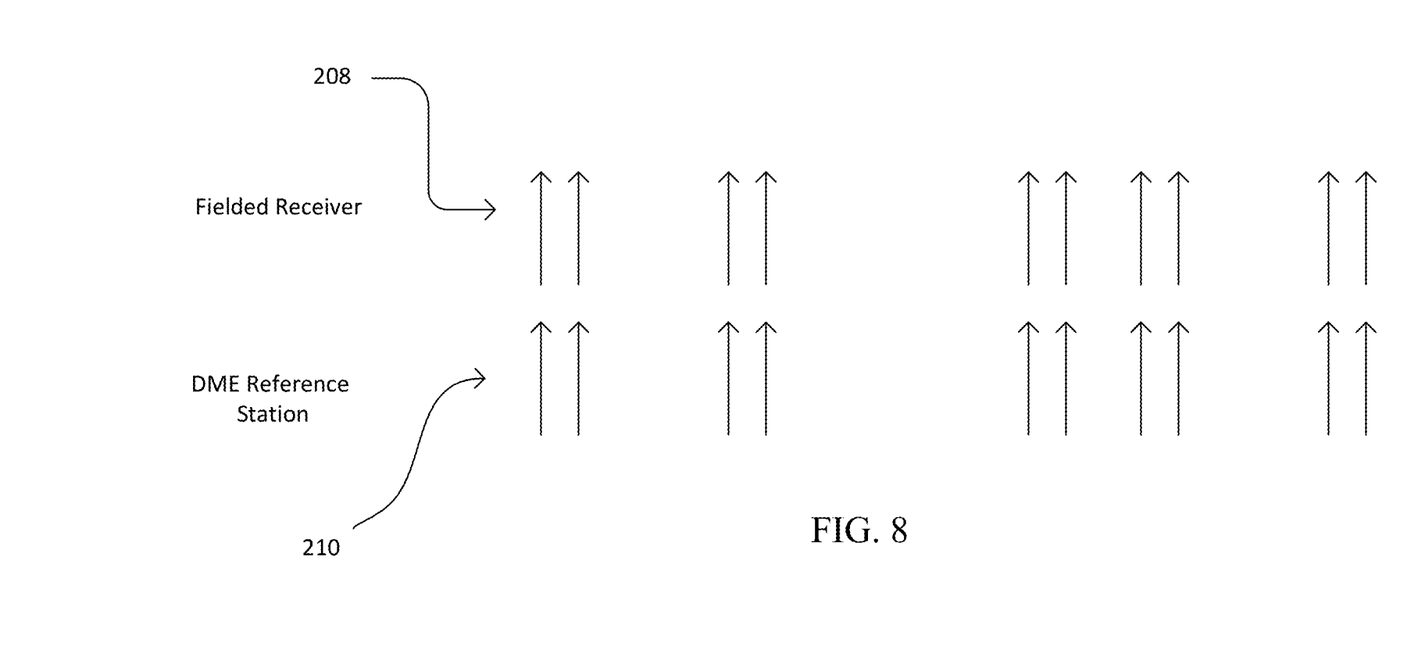
FIG. 8 shows two series of signals versus time in a situation where they are well correlated in time.

FIG. 8 shows a situation once there is a high degree of correlation. In this case, the two series 208 and 210 of pulse doublets are shown as occurring at the same UTC time. The fielded receiver now knows that this is the correct understanding of UTC, or at least a much better understanding than the fielded receiver had at the beginning of the process.

Note that in FIGS. 6-8, the signals are not shown as bursts having a burst width (e.g., 3.5 microseconds) as they do in actuality. Further, in actuality, the signals received from the DME beacon station will be noisy, both in between the bursts and during the bursts.

As can be appreciated, it is assumed that the DME reference station has a better understanding of UTC than does the fielded receiver. This could either be because (a) for some reason the DME reference station is able to successfully receive GPS/GNSS signals while the fielded receiver is not, or (b) the DME reference station has a more stable and well-controlled oscillator, so as to be able to free-run more accurately, than does the fielded receiver.

These techniques may use DME reference stations with antennas having the most gain or directivity in the direction of the known nearby DME beacon stations. For precise time transfer maintenance purposes, it may be beneficial to periodically test and calculate changes due to secondary factors (called ASF) that affect path delays to correct for propagation variations. These methods can also be used to initialize fielded receivers in the event of inadequately precise time transfer from the primary method of PTP over IP networks. It also contemplates use of NTP which is inexpensive and already freely available and accurate enough for these purposes.

While the foregoing has illustrated and described several embodiments in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the disclosure are desired to be protected.

What is claimed is:

1. A system for deriving a precise time reference with the aid of DME beacon signals from a DME beacon station, comprising:

a DME reference station located within range of the DME beacon signals from the DME beacon station, the DME reference station receiving GNSS signals and determining a precise time reference therefrom, the DME reference station also receiving DME beacon signals from the DME beacon station and determining the time of transmission of one or more of the DME beacon signals from the DME beacon station based at least in part on the distance between the DME beacon station and the DME reference station; and a receiver also located within range of the DME beacon signals from the DME beacon station, the receiver being in communication with the DME reference station to receive from the DME reference station the time of transmission of the one or more DME beacon signals, wherein the receiver derives a precise time reference based at least in part on:

the received DME beacon signals and their time of transmission from the DME beacon station, and the distance between the DME beacon station and the receiver.

2. A system as defined in claim 1, wherein the DME beacon signals received from the DME reference station includes time tags for each DME beacon signal received by the DME reference station from the DME beacon station, the time tag including a precise time reference for the time that the DME beacon station sent the respective DME beacon signal.

3. A system as defined in claim 1, wherein the time of transmission of DME beacon signals from the DME beacon station includes UTC time.

\* \* \* \* \*